(12) United States Patent
Kim et al.

(10) Patent No.: US 8,050,517 B2
(45) Date of Patent: Nov. 1, 2011

(54) METHOD AND APPARATUS FOR MODULATING SUB-CHANNEL PIXEL IN MULTI GRAYSCALE MONOCHROME OUTPUT APPARATUS

(75) Inventors: Yun-tae Kim, Yongin-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1147 days.

(21) Appl. No.: 11/822,846

(22) Filed: Jul. 10, 2007

(65) Prior Publication Data

US 2008/0031530 A1 Feb. 7, 2008

(30) Foreign Application Priority Data

Aug. 1, 2006 (KR) .................. 10-2006-0072774

(51) Int. Cl.
*G06K 9/20* (2006.01)
*G06K 9/68* (2006.01)
*G09G 5/02* (2006.01)
(52) U.S. Cl. ......... 382/283; 382/220; 345/589; 345/600
(58) Field of Classification Search .......... 382/237, 382/282, 283; 358/3.13, 3.14, 3.16, 3.19; 345/589, 600

See application file for complete search history.

(56) References Cited

U.S. PATENT DOCUMENTS

| 4,860,373 | A | * | 8/1989 | Hartless et al. | 382/268 |
| 5,455,600 | A | * | 10/1995 | Friedman et al. | 345/597 |
| 5,469,190 | A | * | 11/1995 | Masterson | 345/605 |
| 5,477,305 | A | * | 12/1995 | Parker et al. | 358/3.19 |
| 5,673,065 | A | * | 9/1997 | DeLeeuw | 345/605 |
| 5,825,940 | A | * | 10/1998 | Yamagata et al. | 382/276 |
| 6,809,740 | B1 | * | 10/2004 | Weed | 345/589 |
| 6,853,468 | B2 | * | 2/2005 | Miller et al. | 358/1.9 |
| 7,126,611 | B1 | * | 10/2006 | Weed | 345/589 |
| 7,492,482 | B2 | * | 2/2009 | Gao | 358/3.13 |
| 7,609,277 | B2 | * | 10/2009 | Noel et al. | 345/596 |

FOREIGN PATENT DOCUMENTS

| JP | 2000-188702 | 7/2000 |
| JP | 2004-138783 | 5/2004 |
| KR | 10-2005-0055459 | 6/2005 |
| KR | 10-2006-0021712 | 3/2006 |

OTHER PUBLICATIONS

V. Misic, P. Anderson, "Algebraic Masks for color halftoning" Proc. of SPIE, vol. 566, pp. 441-448, 2005.*

* cited by examiner

*Primary Examiner* — Gregory M Desire
*Assistant Examiner* — Andrae S Allison
(74) *Attorney, Agent, or Firm* — Staas & Halsey LLP (57) ABSTRACT

Provided is a method and apparatus for modulating sub-channel pixels in a multi grayscale monochrome output apparatus, more particularly, a method and apparatus for modulating sub-channel pixels in a multi grayscale monochrome output apparatus that can represent a high grayscale input image on a low grayscale output apparatus through sub-channel pixel modulation.

18 Claims, 9 Drawing Sheets

TEN BITS INPUT $$\begin{bmatrix} 494: 0111101\underline{10} & 488: 0111101\underline{00} \\ 491: 0111101\underline{011} & 485: 0111100\underline{101} \end{bmatrix}$$

THEORETICAL 8-BIT VALUE $$\rightarrow \begin{bmatrix} 123.50 & 122.00 \\ 122.75 & 121.25 \end{bmatrix}$$

$$\begin{bmatrix} 2 & 0 \\ 3 & 1 \end{bmatrix}$$

FIRST, SECOND, AND THIRD
ORIGINAL PATTERN

FIRST CHANNEL ARITHMETIC
$$\begin{bmatrix} 2 & 0 \\ 3 & 1 \end{bmatrix} + \begin{bmatrix} 1 & 2 \\ 3 & 0 \end{bmatrix} = \begin{bmatrix} 3 & 2 \\ 6 & 1 \end{bmatrix} \rightarrow \begin{bmatrix} 0 & 0 \\ +1 & 0 \end{bmatrix} \quad \begin{bmatrix} 123 & 122 \\ 123 & 121 \end{bmatrix}$$

FIRST CHANNEL ORIGINAL PATTERN | FIRST CHANNEL MASK PATTERN | FIRST CHANNEL DITHERING ARITHMETIC | FIRST CHANNEL WEIGHTED PATTERN | FIRST CHANNEL VALUE

SECOND CHANNEL ARITHMETIC
$$\begin{bmatrix} 2 & 0 \\ 3 & 1 \end{bmatrix} + \begin{bmatrix} 0 & 3 \\ 2 & 1 \end{bmatrix} = \begin{bmatrix} 2 & 3 \\ 5 & 2 \end{bmatrix} \rightarrow \begin{bmatrix} 0 & 0 \\ +1 & 0 \end{bmatrix} \quad \begin{bmatrix} 123 & 122 \\ 123 & 121 \end{bmatrix}$$

SECOND CHANNEL ORIGINAL PATTERN | SECOND CHANNEL MASK PATTERN | SECOND CHANNEL DITHERING ARITHMETIC | SECOND CHANNEL WEIGHTED PATTERN | SECOND CHANNEL VALUE

THIRD CHANNEL ARITHMETIC
$$\begin{bmatrix} 2 & 0 \\ 3 & 1 \end{bmatrix} + \begin{bmatrix} 2 & 0 \\ 1 & 3 \end{bmatrix} = \begin{bmatrix} 4 & 0 \\ 4 & 4 \end{bmatrix} \rightarrow \begin{bmatrix} +1 & 0 \\ +1 & +1 \end{bmatrix} \quad \begin{bmatrix} 124 & 122 \\ 123 & 122 \end{bmatrix}$$

THIRD CHANNEL ORIGINAL PATTERN | THIRD CHANNEL MASK PATTERN | THIRD CHANNEL DITHERING ARITHMETIC | THIRD CHANNEL WEIGHTED PATTERN | THIRD CHANNEL VALUE $$\begin{bmatrix} 123.33 & 122.00 \\ 123.00 & 121.33 \end{bmatrix}$$

AVERAGE VALUE FOR EACH PIXEL
(FIRST CHANNEL VALUE + SECOND CHANNEL VALUE + THIRD CHANNEL VALUE)/3

METHOD AND APPARATUS FOR MODULATING SUB-CHANNEL PIXEL IN MULTI GRAYSCALE MONOCHROME OUTPUT APPARATUS

CROSS-REFERENCE TO RELATED APPLICATIONS

This application claims priority from Korean Patent Application No. 10-2006-0072774 filed on Aug. 1, 2006 in the Korean Intellectual Property Office, the disclosure of which is incorporated herein by reference in its entirety.

BACKGROUND OF THE INVENTION

1. Field of the Invention

The present invention relates to a method and apparatus to modulate sub-channel pixels in a multi grayscale monochrome output apparatus, and more particularly, to a method and apparatus to modulate sub-channel pixels in a multi grayscale monochrome output apparatus that can represent a high grayscale input image on a low grayscale output apparatus through sub-channel pixel modulation.

2. Description of the Related Art

In order to represent medical images, such as MRI or CT, a monochrome display is required. The monochrome display includes a monochrome display that represents information of one pixel of an image in the display as one pixel, and a monochrome display that represents the one pixel information using sub-channel pixels of R, G, and B with no color filters. In the latter case, the color filters are removed from a color display, and thus a manufacturing process is simple. However, since the number of cases of the one pixel information of the input image to be represented by the sub-channel pixels of R, G, and B with no color filters is large, an appropriate pixel representation method is required.

Figure 1:
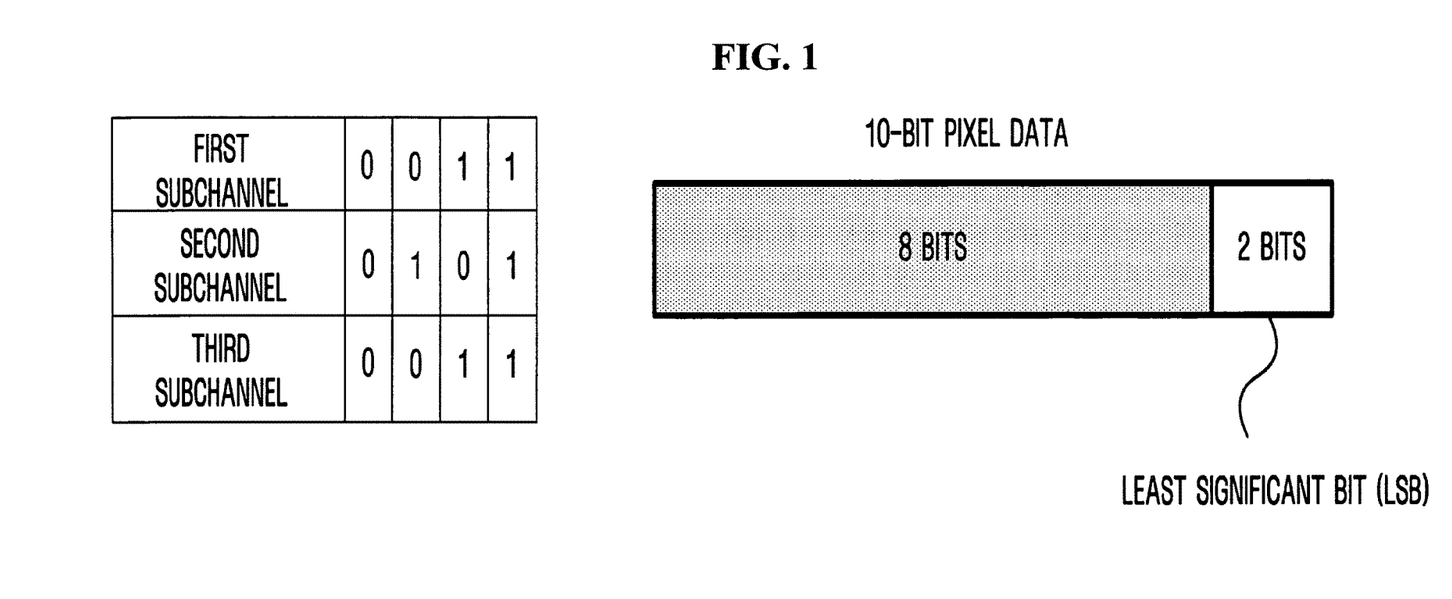
FIG. 1 is a diagram showing a change of each sub-channel pixel in a monochrome output apparatus.

FIG. 1 shows a change of each sub-channel pixel in a monochrome output apparatus. For example, in the monochrome output apparatus, in order to represent "0", all the sub-channel pixels become "0". Further, in order to represent "1", all the pixels of the first, second, and third channels become "1". Information between "0" and "1" can be represented by combining the individual sub-channels. Accordingly, excess grayscale levels can be represented by varying pixel information of the sub-channels.

Meanwhile, in a case when a high grayscale input image is represented in a low grayscale output apparatus, when a required color cannot be used, a dithering method that represent a similar color by mixing dots of different grayscale colors may be primarily used. For example, gray having a specific grayscale level may be represented for the entire image according to a ratio of black dots and white dots within a certain plane in a display or a printing apparatus, or pink having various grayscale levels may be represented according to a ratio of red dots and white dots. The dithering method is primarily used to increase reality of an image and allows a rough and uneven outline so as not to meet a person's eye in a low definition output apparatus.

Known technologies using dithering include a random dithering method that adds a random signal generated from a random generator to the least significant bit (LSB) of an input image signal and a screen dithering method that prescribes a mask value for dithering and then adds the mask value to the least significant bit or compares the mask value with the least significant bit so as to determine a weighted value.

In the random dithering method, arithmetic is simple, but an ununiform pattern may occur since noise is added to an input value. Meanwhile, in the screen dithering, since the prescribed mask pattern is added to or compared with the input value, a regular lattice pattern occurs.

As such, when the known method is used, the entire grayscale level is improved, but there is a problem in that deterioration of image quality in an image subjected to dithering, such as stain or regular lattice pattern, occurs.

Figure 2:
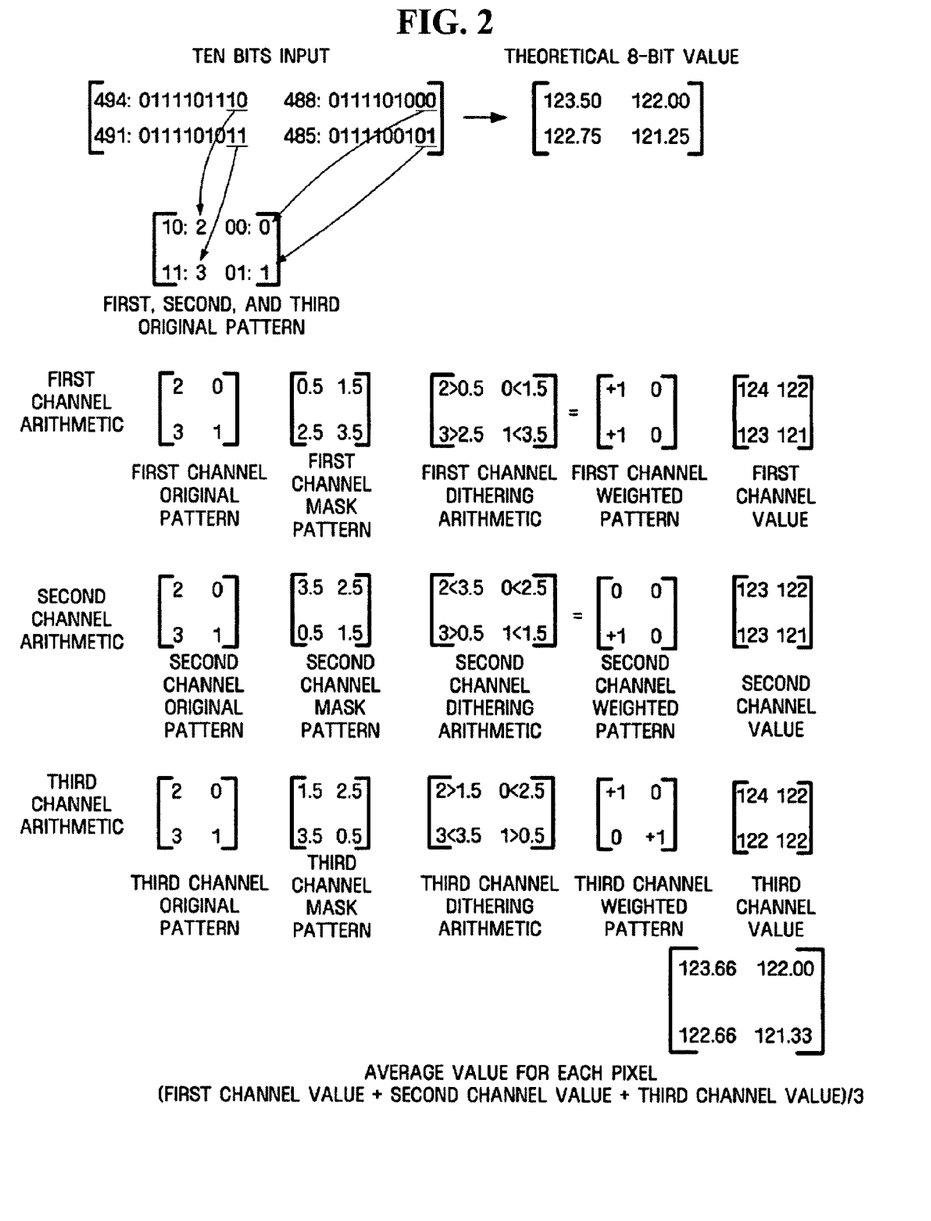
FIG. 2 is a diagram showing an example where screen dithering according to the related art is performed.

FIG. 2 shows an example where screen dithering according to the related art is performed.

As shown in FIG. 2, when 10-bit input signals are input for four pixels but 8-bit output signals are output, the input signals cannot be completely represented. For example, referring to FIG. 2, when it is assumed that the 10-bit pixel information is 494, 488, 491, and 485, the 8-bit output information is theoretically 123.50, 122.00, 122.75, and 121.25, respectively, but a part of the 10-bit input signal may be lost since the 8-bit information is obtained by truncating or reducing two bits among the ten bits. For example, when three sub-channels having a low grayscale output value exist, high grayscale input information can be represented by modulating pixel information of the first, second, and third channels.

For example, in the screen dithering method of FIG. 2, the lowest two bits are set as the least significant bits (LSB) of the input image signal. In the invention, the matrix having the least significant bits of each pixel in a pixel region subject to modulation is defined as original patterns of first, second, and third channels. For example, when screen dithering is applied to four pixels, the original patterns of the first, second, and third channels having the two least significant bits become the 2×2 matrixes. When the underlined two least significant bits from the information of each of four pixels shown in FIG. 1 are selected and the selected bits are represented in an order of (1, 1), (1, 2), (2, 1), and (2, 2), a 2×2 matrix of (2, 0, 3, 1) is obtained. In general, binary arithmetic is performed, and the above matrix is represented by $(10_{(2)}, 00_{(2)}, 11_{(2)}, 01_{(2)})$ in binary. In the specification, however, decimal arithmetic is performed. In addition, in the detailed description of the invention, the 2×2 matrix is basically represented in an order of (1, 1), (1, 2), (2, 1), and (2, 2).

As described above, a single input signal having an initial input value of 10 bits is divided in to the first, second, and third sub-channels. Accordingly, by selecting the individual two least significant bits, the 2×2 matrixes serving as the original patterns of the first, second, and third channels respectively become the 2×2 matrixes of (2, 0, 3, 1).

In case of screen dithering, dithering can be performed by applying a prescribed mask pattern. For example, the first channel mask pattern becomes a 2×2 matrix of (0.5, 1.5, 2.5, 3.5) in an order of (1, 1), (1, 2), (2, 1), and (2, 2). Similarly, the second channel mask pattern becomes a 2×2 matrix of (3.5, 2.5, 0.5, 1.5), and the third channel mask pattern becomes a 2×2 matrix of (1.5, 2.5, 3.5, 0.5). The values of the mask patterns for screen dithering can be arbitrarily defined, and thus values different from the above-described values may be used as the values of the mask patterns.

Then, the first channel original pattern and the first channel mask pattern are compared with each other. As the comparison result, when the value of the original pattern is larger than the value of the mask pattern, a weighted value "+1" is determined and, when the value of the original pattern is smaller than the value of the mask pattern, a weighted value "0" is determined. Accordingly, from the comparison result of the original pattern and the mask pattern, a 2×2 weighted pattern of (+1, 0, +1, 0) is obtained.

Similarly, when second mask pattern and third mask pattern are applied to the second channel and the third channel, respectively, a weighted pattern of the second channel becomes a 2×2 matrix of (0, 0, +1, 0), and a weighted pattern of the third channel becomes a 2×2 matrix of (+1, 0, 0, +1).

Accordingly, the pixel values of each sub-channel can be modulated by adding the 2×2 matrix serving as the weighted pattern of each channel to the higher-order 8 bits. For example, as shown in FIG. 2, for the information of the four pixels as the input signal, the weighted values of each channel are added to the higher-order 8 bits among the original 10 bits, and thus the final pixel values of each channel are determined. As for the first channel among the sub-channels, since the values of the higher-order 8 bits from the input values of the four pixels are (123, 122, 122, 121), and the weighted values are (+1, 0, +1, 0), (124, 122, 123, 121) is obtained by adding the two 2×2 matrixes.

Similarly, if screen dithering is applied to the second channel and the third channel, the 8-bit output values of the second channel become (123, 122, 123, 121), and the 8-bit output values of the third channel become (124, 122, 122, 122).

Accordingly, when the 10-bit input values are given for the four pixels and the 8-bit output values are output, the average values of the output values of the four pixels in the first, second, and third sub-channels are (123.66, 122, 122.66, 121.33). Therefore, it is possible to approximate the 10-bit input values to theoretical 8-bit values (123.50, 122, 122.75, 121.25).

That is, even though the 8-bit values are output as output information, the 10-bit input values can be approximately represented by averaging the 8-bit output values of the first, second, and third sub-channels. Specifically, when high grayscale input information is output at a low grayscale level, grayscale characteristics can be improved by processing the output information of a plurality of sub-channels having low grayscale levels using the mask. Therefore, the loss of the information due to low grayscale output is compensated through pixel modulation of the sub-channels, thereby representing high grayscale information.

However, when the screen dithering method is applied, the same 2×2 pattern is repeated, and the output may have the same repeated pattern. Accordingly, a regular pattern may occur.

SUMMARY OF THE INVENTION

Additional aspects and/or advantages of the invention will be set forth in part in the description which follows and, in part, will be apparent from the description, or may be learned by practice of the invention.

The invention has been finalized in consideration of the above problems, and it is an object of the invention to output a high-quality image by modulating low grayscale sub-channel pixels when a high grayscale monochrome image is represented on a low grayscale monochrome output apparatus.

According to an aspect of the invention, there is provided a method of modulating sub-channel pixels in a multi grayscale monochrome output apparatus that represents a high grayscale (M+K)-bit (where M and K are an integer of 1 or more) monochrome input image through low grayscale M-bit sub-channels, the method including generating a plurality of mask patterns, selecting mask patterns for a plurality of sub-channels from the plurality of generated mask patterns, determining weighted values using the values of the selected mask patterns and data of K least significant bits of the input image, and calculating M-bit data of the plurality of sub-channels on the basis of the weighted values.

According to another aspect of the invention, there is provided an apparatus to modulate sub-channel pixels in a multi grayscale monochrome output apparatus that represents a high grayscale (M+K)-bit (where M and K are an integer of 1 or more) monochrome input image through low grayscale M-bit sub-channels, the apparatus including a mask pattern generation unit generating a plurality of mask patterns, a mask pattern selection unit selecting mask patterns for a plurality of sub-channels from the plurality of generated mask patterns, a dithering arithmetic unit determining weighted values using the values of the selected mask pattern and data of K least significant bits (LSB) of the input image, and a low grayscale calculation unit calculating M-bit data the plurality of sub-channels on the basis of the weighted values.

BRIEF DESCRIPTION OF THE DRAWINGS

These and/or other aspects and advantages of the invention will become-apparent and more readily appreciated from the following description of the embodiments, taken in conjunction with the accompanying drawings of which:

FIG. 5 is a diagram showing the result of dithering arithmetic for four input pixels according to an embodiment of the invention;

DETAILED DESCRIPTION OF THE PREFERRED EMBODIMENTS

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

Hereinafter, an exemplary embodiment of the invention will be described in detail with reference to the accompanying drawings.

Figure 3:
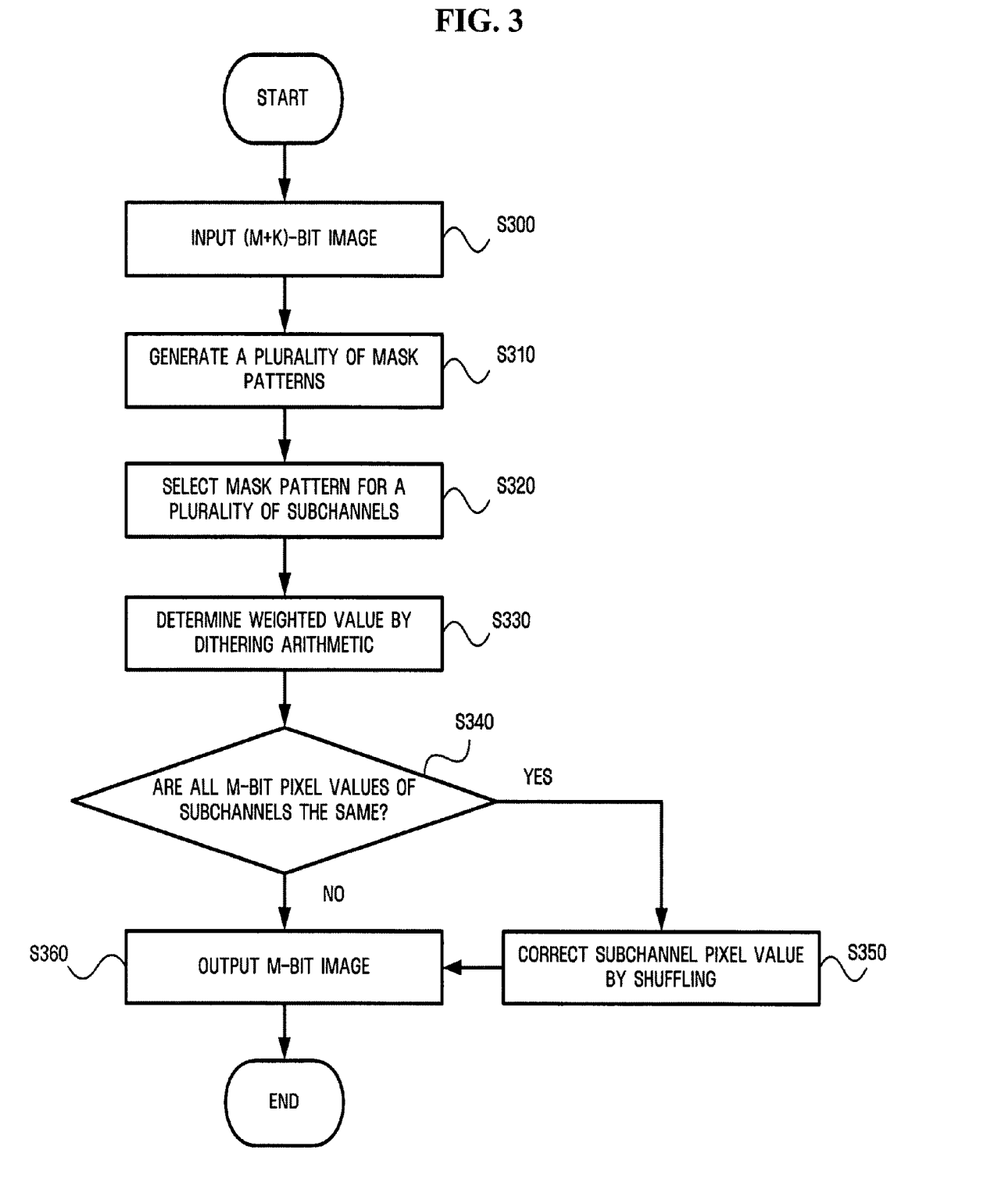
FIG. 3 is a flowchart showing a method of modulating sub-pixels in a multi grayscale monochrome according to an embodiment of the invention.

FIG. 3 is a flowchart showing a method of modulating sub-pixels in a multi grayscale monochrome according to an embodiment of the invention.

A method of modulating sub-pixels in a multi grayscale monochrome output apparatus according to an embodiment of the invention includes a operation of inputting a (M+K)-bit image (Operation S300), generating a plurality of mask patterns (Operation S310), selecting mask patterns (Operation S320), determining weighted values by dithering arithmetic (Operation S330), shuffling operation (Operation S350), and outputting an M-bit image (Operation S360).

As for pixels of an input image, (M+K)-bit high grayscale information is input (Operation S300). In contrast, upon the output of image information, M-bit low grayscale data for each pixel is output. M and K are an integer of 1 or more.

Accordingly, when the input image information is output at a low grayscale level, a method of modulating sub-channel pixels described below is applied. As the modulation method, a dithering method that applies mask patterns for the least significant bits of two or more sub-channels is used. The number of sub-channels may be two or more. In the detailed description, three sub-channels are illustrated.

First, the size of the mask pattern is determined. The size of the mask pattern is determined by the least significant bits (LSB). For example, when the LSB is 2 bits, a 2×2 matrix having $2^2$, that is, four elements, is determined, and, when the LSB is K bits, an N×N matrix having $2^K$, that is, K elements, is determined. Accordingly, the number of pixels subject to the sub-channel pixel modulation method can be determined according to the size of the mask pattern. Accordingly, an image processing can be performed on a plurality of pixels, for example, 2×2, 4×4, 6×6, or 8×8 pixels according to the size of the mask pattern.

Figure 4:
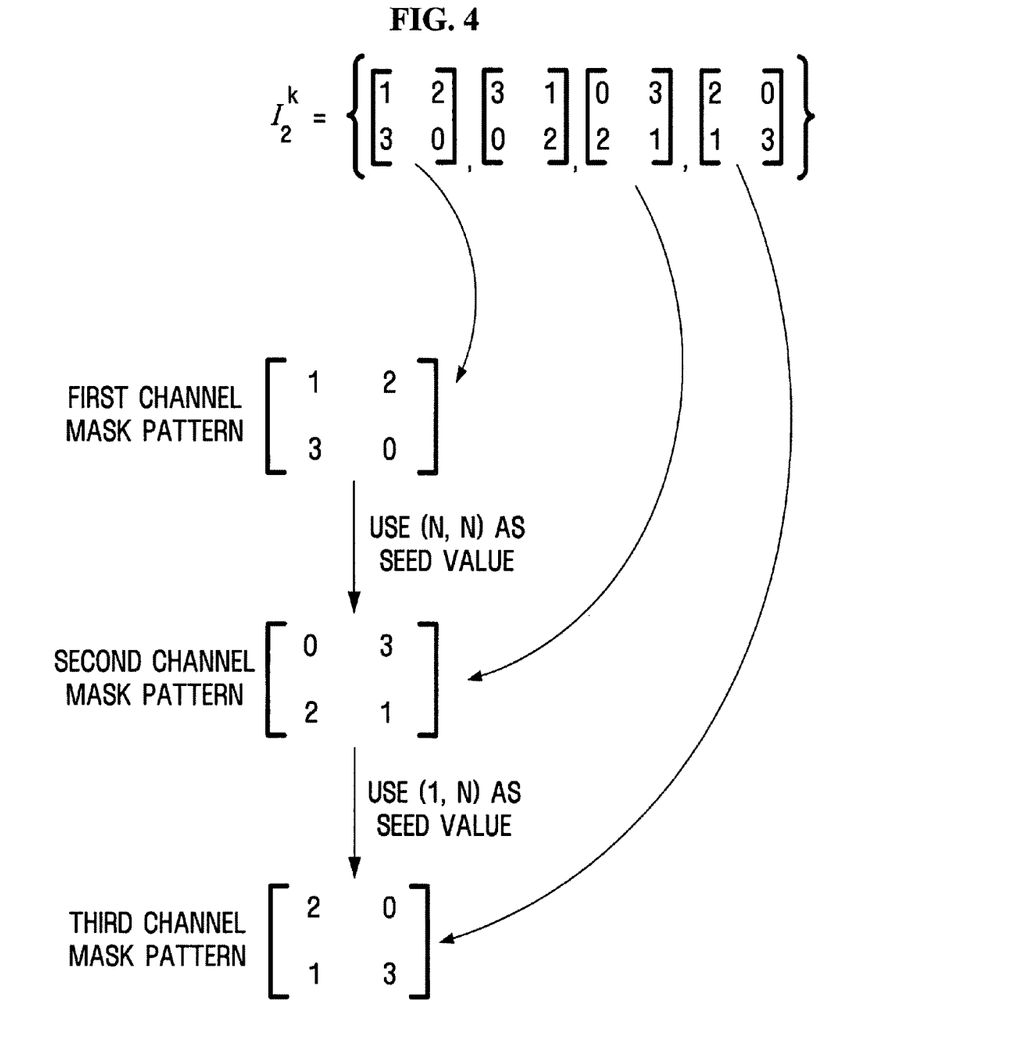
FIG. 4 is a diagram showing a process of selecting mask patterns for sub-channels when the number of sub-channels is 3 in a mask pattern of a 2×2 matrix.

For example, when each mask pattern is determined by a 2×2 matrix, as shown in FIG. 4, the mask patterns may be a plurality of 2×2 matrixes having values of 0, 1, 2, and 3. For example, among a plurality of matrixes, such as a plurality of 2×2 matrixes having values of 0, 1, 2, and 3, four 2×2 matrixes are (1, 2, 3, 0), (3, 1, 0, 2), (0, 3, 2, 1), and (2, 0, 1, 3), respectively, in an order of (1, 1), (1, 2), (2, 1), and (2, 2). The four matrixes are just an example, and various 2×2 matrixes having values of 0, 1, 2, and 3 and different orders and positions may be used.

Then, when four 2×2 matrixes in Equation 1 are set as seed masks, using the seed masks and Equation 2, the mask patterns can be expanded to 2×2, 4×4, 6×6, or 8×8 matrix.

Equation 1
$$I_2^K = \left\{ \begin{bmatrix} 1 & 2 \\ 3 & 0 \end{bmatrix}, \begin{bmatrix} 3 & 1 \\ 0 & 2 \end{bmatrix}, \begin{bmatrix} 0 & 3 \\ 2 & 1 \end{bmatrix}, \begin{bmatrix} 2 & 0 \\ 1 & 3 \end{bmatrix} \right\}$$

Equation 2
$$I_{2n} = \left\{ \begin{bmatrix} 4I_n^K + 1 & 4I_n^K + 2 \\ 4I_n^K + 3 & 4I_n^K \end{bmatrix}, \begin{bmatrix} 4I_n^K + 3 & 4I_n^K + 1 \\ 4I_n^K & 4I_n^K + 2 \end{bmatrix}, \begin{bmatrix} 4I_n^K & 4I_n^K + 3 \\ 4I_n^K + 2 & 4I_n^K + 1 \end{bmatrix}, \begin{bmatrix} 4I_n^K + 2 & 4I_n^K \\ 4I_n^K + 1 & 4I_n^K + 3 \end{bmatrix} \right\}$$

Here, K is the number of least significant bits to be processed when the high grayscale input information is converted into low grayscale levels, and N is the number of rows or columns in the matrix of each of the mask patterns.

Accordingly, when the 2×2 matrix is used as the mask pattern, like Equation 1, four mask patterns can be generated. Then, according to an embodiment of the invention, a sub-channel mask pattern among the four mask patterns is selected. Specifically, the mask patterns are generated, and the sub-channel mask pattern is arbitrarily selected among the generated mask patterns.

A description will be given for a case where the size of the mask pattern corresponds to a 2×2 matrix. However, when the number of the least significant bits is K, as the mask pattern, a plurality of mask patterns having elements of integers ranging 0 to $2^K-1$ can be generated.

For example, when the pixel information of the input image corresponds to 10 bits, and the pixel information of the output image corresponds to 8 bits, K becomes 2, and the size of the mask pattern becomes the 2×2 matrix. Then, when the size of the mask pattern is the 2×2 matrix and the elements of the mask pattern matrix are 0, 1, 2, and 3, as shown FIG. 4, four mask patterns can be generated. For example, if the number of sub-channels is three, the mask patterns are selected as follows.

One among the generated four mask patterns is arbitrarily selected as a first channel mask pattern. To this end, if one of integer numbers of 0 to 3 generated by a random number generator is generated, a 2×2 matrix that starts with the corresponding integer number or is assigned with the corresponding integer number is selected as the first channel mask pattern.

The first channel mask pattern is obtained using a matrix of a second channel mask pattern. For example, as the first channel mask pattern, a matrix pattern having a first element of the second channel mask pattern as an element (N, N) is selected. The element (2, 2) in the first channel mask pattern of the 2×2 matrix corresponds to the element (1, 1) of the second channel mask pattern.

Alternatively, the second channel mask pattern may be obtained by inverting one among the elements of the first channel mask pattern. For example, the element (1, 1) of first channel mask pattern is converted to another integer number through the inversion, a mask pattern that has the inverted integer number as the element (1, 1) is selected as the second channel mask pattern. Specifically, when the integer number at the element (1, 1) is $11_{(2)}$ in binary (3 in decimal), the value of $00_{(2)}$ (0 in decimal) is obtained through the inversion, and the second channel mask pattern having $00_{(2)}$ as the element (1, 1) is selected.

As the third channel mask pattern, a mask pattern different from the first channel mask pattern or the second channel mask pattern is selected. For example, in the third channel, a matrix that has the element (1, N) of the first channel mask pattern as the element (1, 1) is selected.

Further, the third channel mask pattern may be selected by various methods. For example, a mask pattern that starts with the first element (1, 1) in a matrix obtained by rotating the first channel mask pattern in a clockwise direction or a counterclockwise direction or a mask pattern that starts with the integer number of the first element in a matrix obtained by rotating the second channel mask pattern in a clockwise direction or a counterclockwise direction may be selected.

Synthetically, the size of the mask pattern is determined by K that is the number of the least significant bits, and various mask patterns can be generated according to the determined size of the mask pattern. Among the generated mask patterns, the individual mask patterns are selected according to the number of sub-channels.

Accordingly, the mask patterns for the individual sub-channels may be selected among the mask patterns generated by an arbitrary random number generator, or elements among the elements of each of the mask patterns by the number of sub-channels may be selected and the mask patterns having the corresponding elements as the first elements may be selected. As such, various methods of selecting the mask patterns may be used. In addition, selection methods that can be substituted or changed by those skilled in the art may be included.

FIG. 4 shows a process of selecting a sub-channel mask pattern when the number of sub-channels is three in a mask pattern of a 2×2 matrix.

First, a plurality of mask patterns of 2×2 matrixes having 0, 1, 2, and 3 as the elements are generated. Referring to FIG. 4, one of the generated four mask patterns is arbitrarily selected and determined as the first channel mask pattern.

For example, as shown in FIG. 4, among the generated four mask patterns, a 2×2 matrix of (1, 2, 3, 0) is selected as the first channel mask pattern.

Then, as the second channel mask pattern, a mask pattern that starts with the integer value 0 of the element (2, 2) by substituting the element (N, N) for the element (1, 1), that is, a matrix (0, 3, 2, 1) is selected.

As the third channel mask pattern, a mask pattern that starts with 2 as the element corresponding to the element (1, N), that is, a matrix (2, 0, 1, 3) is selected.

After the mask patterns for the individual sub-channels are selected, the dithering arithmetic is performed on the original patterns and the mask patterns of the individual sub-channels (Operation S330). With the dithering arithmetic, the weighted values that are reflected in the pixel values of the individual sub-channels are obtained (Operation S330).

With the dithering arithmetic, the mask patterns of the individual sub-channels and the original patterns having the K least significant bits (LSB) of the individual pixels are added or compared with each other, thereby obtaining the weighted values. In case of the addition arithmetic, if the sum of the original pattern and the mask pattern is larger than the critical value, the weighted value becomes 1 and, if the sum is smaller than the critical value, the weighted value becomes 0. In case of the comparison arithmetic, the value of the mask pattern and the value of the original pattern are compared with each other. Then, if the value of the original pattern is larger than the value of the mask pattern, the weighted value becomes 1 and, if the value of the original pattern is smaller than the value of the mask pattern, the weighted value becomes 0.

FIG. 5 shows the result of the dithering arithmetic for four input pixels according to an embodiment of the invention.

For example, as shown FIG. 5, 10 bits are respectively input for the four pixels. Meanwhile, when 8 bits are output in the output apparatus, the lowest two bits become the least significant bits (LSB). Accordingly, dithering is performed while truncating the two least significant bits. In this case, the number of sub-channels is three.

The original patterns are formed by truncating the least significant bits. In FIG. 5, for the four pixels, the two significant bits are truncated, and the 2×2 matrix of (2, 0, 3, 1) is determined as the original patterns.

First, the first channel mask pattern selected in FIG. 4 is added to the first channel original pattern. If the sum is equal to or more than 4 as a critical value, a weighted value +1 is obtained and, if the sum is less than 4, a weighted value 0 is obtained, that is, no weighted value is obtained. As the critical value, in general, when the number of the least significant bits is K, an integer number of $2^K$ is selected. Alternatively, a predetermined value may be defined as a critical value.

The dithering arithmetic in FIG. 5 will now be described. The first channel original pattern is (2, 0, 3, 1), and the first channel mask pattern is (1, 2, 3, 0). Then, the sum of the two matrixes is (3, 2, 6, 1). As for the values, if the value is 4 or more, the weighted value is +1 and, if the value is less than 4, the weighted value is 0. Accordingly, a 2×2 weighted pattern obtained by the dithering arithmetic is (0, 0, +1, 0). Next, data of the original pixel, from which the least significant bits are truncated, and the weighted pattern are added so as to calculate the final values of the first channel for the four pixels. Next, the data (123, 122, 122, 121) of the original pixel for the first channel, from which the least significant bits are truncated, and the 2×2 matrix (0, 0, +1, 0) obtained by the dithering arithmetic are added, such that (123, 122, 123, 121) is obtained as first channel output data by the dithering arithmetic.

Similarly, in the dithering arithmetic for the second channel and the third channel, low grayscale pixel data is obtained in the same manner. For example, as shown in FIG. 5, the second channel original pattern is (2, 0, 3, 1), and the second channel mask pattern is (0, 3, 2, 1). These patterns are added by the dithering arithmetic, such that (2, 3, 5, 2) is output. Next, if the weighted value +1 is assigned for the value equal to or more than the critical value 4, a weighted pattern (0, 0, +1, 0) is obtained. Next, the data (123, 122, 122, 121) of the original pixel for the second channel, from which the least significant bits are truncated, and the weighted pattern (0, 0, +1, 0) are added, such that (123, 122, 123, 121) is obtained as second channel output data by the dithering arithmetic.

Similarly, if the dithering arithmetic is performed for the third channel, (124, 122, 123, 122) is obtained as third channel output data.

As such, by performing the dithering arithmetic on plurality of sub-channels for the four pixels, low grayscale output values of the sub-channels for the individual pixels are obtained. The average values of the sub-channel output values in FIG. 5 are (122.33, 122, 123, 121.33) for the four pixels. From this, it can be seen that the output values approximate the original 10-bit input values (123.50, 122, 122.75, 121.25).

After the weighted values obtained by the dithering arithmetic are reflected in the output values of the individual sub-channels, a shuffling operation may be provided (Operation S350). The shuffling operation may be applied when the output values of the individual sub-channels are the same after the dithering arithmetic (Operation S340).

Figure 6:
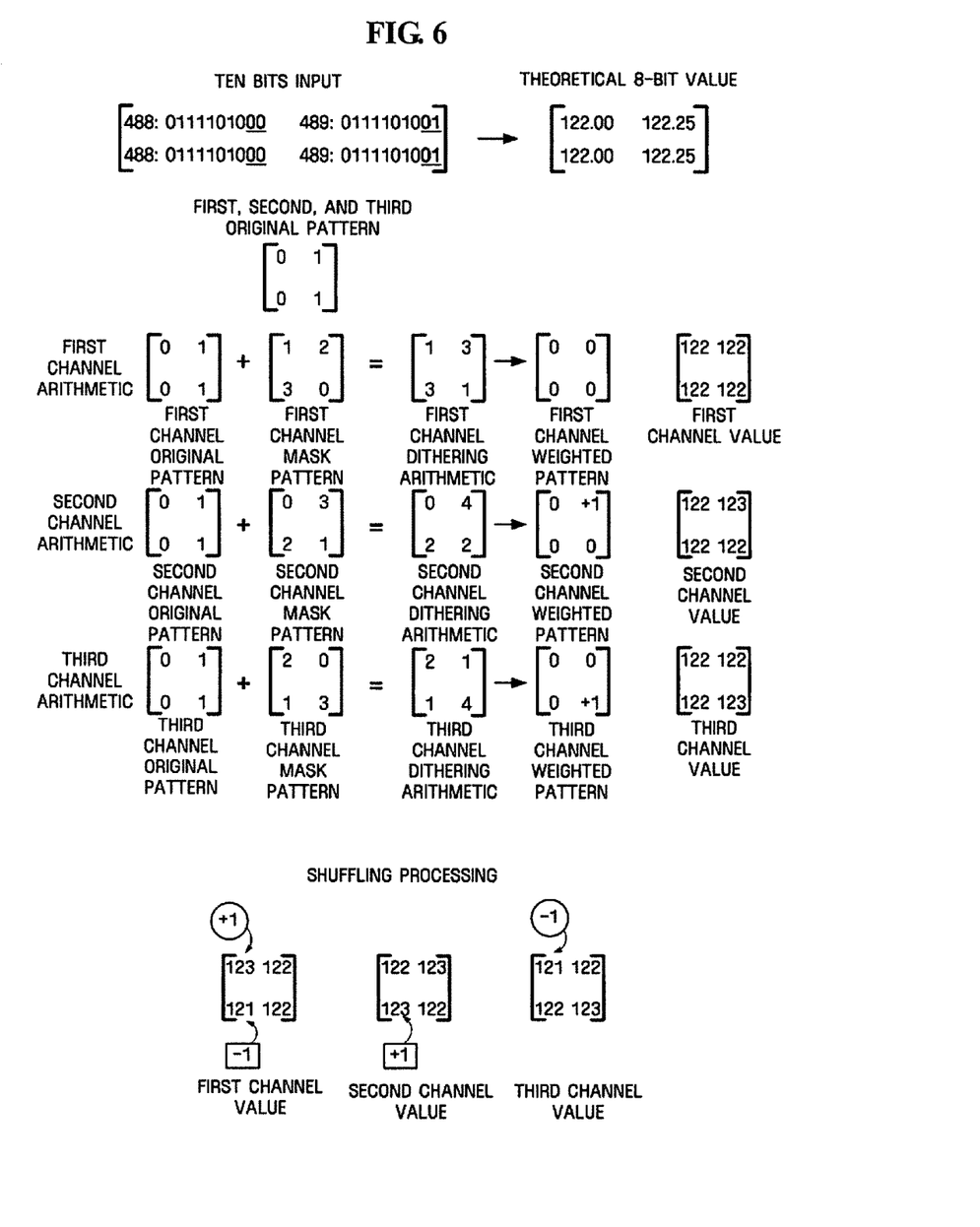
FIG. 6 is a diagram showing the result of shuffling after the dithering arithmetic according to an embodiment of the invention.

FIG. 6 shows the result of shuffling after the dithering arithmetic according to an embodiment of the invention.

For example, dithering arithmetic may be performed in order to output 8-bit output signals for four 10-bit input pixels (Operation S330). However, when the value of the least significant bit of data in the 10-bit input pixels is 0 (zero) or very small, the output values of the individual sub-channels may be the same by the dithering arithmetic (Operation S340).

For example, in FIG. 6, before the dithering processing, when the value of the least significant bit is 0 (zero) or 1, the dithering arithmetic may be performed by the mask patterns for the plurality of sub-channels. As shown in FIG. 6, when the number of sub-channels is 3, a 2×2 weighted pattern obtained by the dithering arithmetic for the first channel is (0, 0, 0, 0), a weighted pattern for the second channel is (0, +1, 0, 0), and a weighted pattern for the third channel is (0, 0, 0, +1).

Therefore, the first channel value by the dithering arithmetic is (122, 122, 122, 122), the second channel value by the dithering arithmetic is (122, 123, 122, 122), and the third channel value by the dithering arithmetic is (122, 122, 122, 123). Accordingly, the pixel values of the plurality of sub-channels corresponding to the element (1, 1) and (2, 1) are the same.

As for the pixels corresponding to the elements (1, 1) and (2, 1), even though the dithering arithmetic is performed, there is no change in value by dithering. Accordingly, these regions with no change are distinguished from other regions, in which the values of the sub-channels are modulated by dithering, which causes a contour phenomenon. In order to prevent this phenomenon, the following shuffling operation is introduced in order to obtain an effect as if the values of the sub-channels are modulated for all the pixels.

The shuffling may be applied when the output data values of the plurality of sub-channels by the dithering arithmetic are the same (Operation S340). The pixel values of the sub-channels output after the dithering arithmetic are compared with one another, and if the pixel values are the same, the shuffling operation is applied (Operation S350).

In the shuffling operation, two sub-channels among the plurality of sub-channels corresponding to one pixel are selected, 1 is added to the value of one channel, and 1 is subtracted from the other channel. Alternatively, a predetermined number may be added to the value of one of the two sub-channels, and the predetermined number is subtracted from the value of the other channel. Next, the values of the sub-channel are collectively added, such that the same value as that before the shuffling operation is obtained.

The two sub-channels may be selected by a random generator that generates a random number. For example, as shown in FIG. 6, when the number of sub-channels is three, for the first pixel, the shuffling operation may be applied to the first and third channels. That is, +1 is added to an R channel, and −1 is added to a B channel. Simultaneously, for the third pixel, when the first and second channels are selected by the random generator, 1 is added to the first channel, and −1 is added to the second channel.

After the shuffling operation, the pixel values of the individual sub-channels are output in forms of M bits. As for the pixels that do not need to be subject to the shuffling operation, the pixel values of the individual sub-channels obtained by the dithering arithmetic are output in forms of M bits.

Figure 7A:
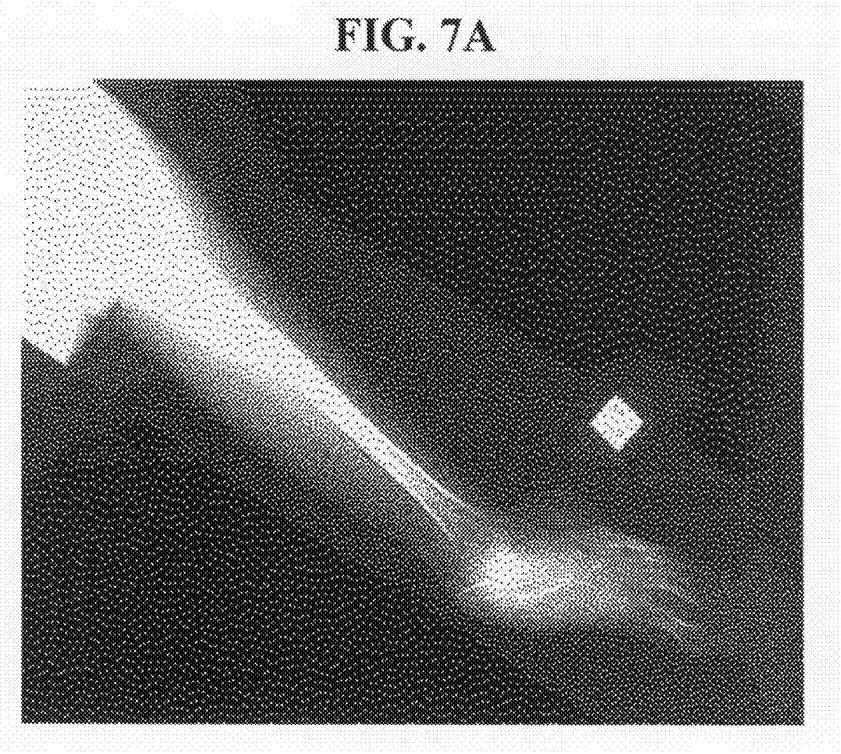
FIG. 7A is a diagram showing the result when pixel modulation of sub-channels is not performed.
Figure 7B:
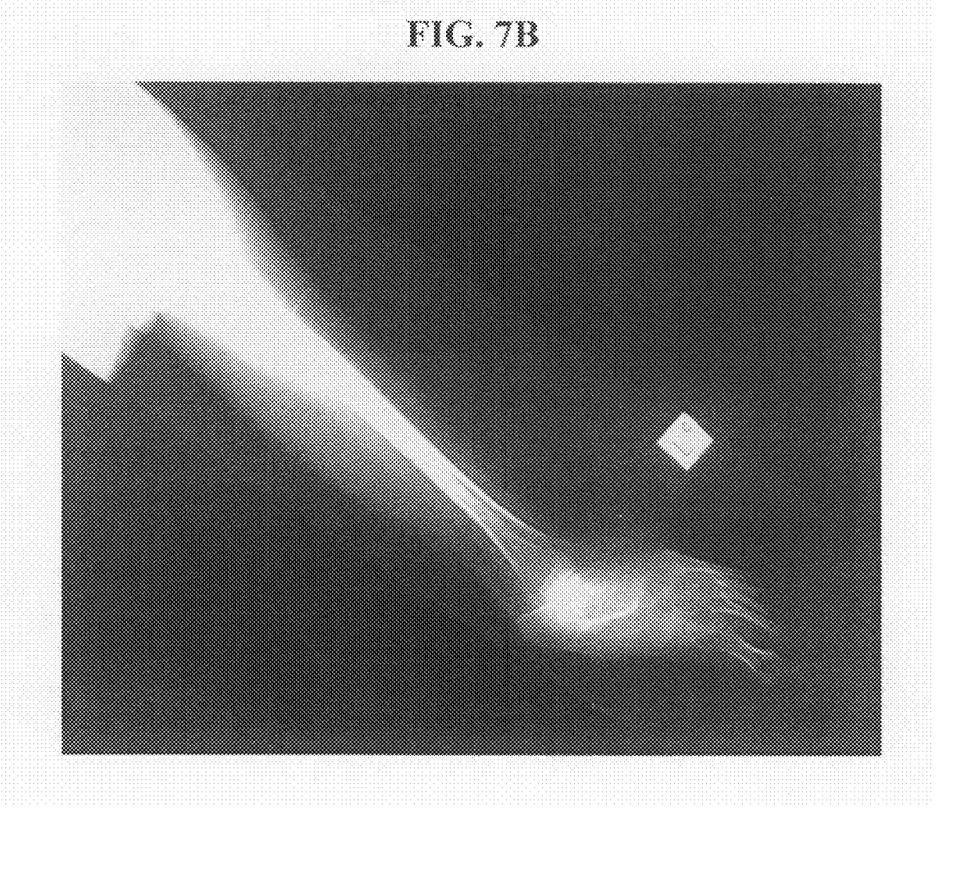
FIG. 7B is a diagram showing the result when the pixel modulation of the sub-channels is performed according to an embodiment of the invention.

FIG. 7A shows the result when pixel modulation of the sub-channels is not performed, and FIG. 7B shows the result when pixel modulation of the sub-channels is performed according to an embodiment of the invention.

As shown in FIG. 7A, the lowest four bits of each of three sub-channels in an 8-bit monochrome input signal are truncated. When an output device outputs 4 bits, the four least significant bits are truncated and discarded, and it can be seen that a contour phenomenon occurs in the image, and quality of the image is degraded.

For comparison with the result of FIG. 7A, FIG. 7B shows the result when the pixel values of the sub-channels are modulated by the dithering arithmetic and the shuffling operation. Like FIG. 7A, the four least significant bits are truncated, but the pixel values of the individual sub-channels are modulated according to the above-described embodiment of the invention. Then, it can be seen that the contour phenomenon and deterioration of image quality, such as stains or the like, in FIG. 7A can be markedly reduced, and a change in image quality is natural and smooth.

Figure 8:
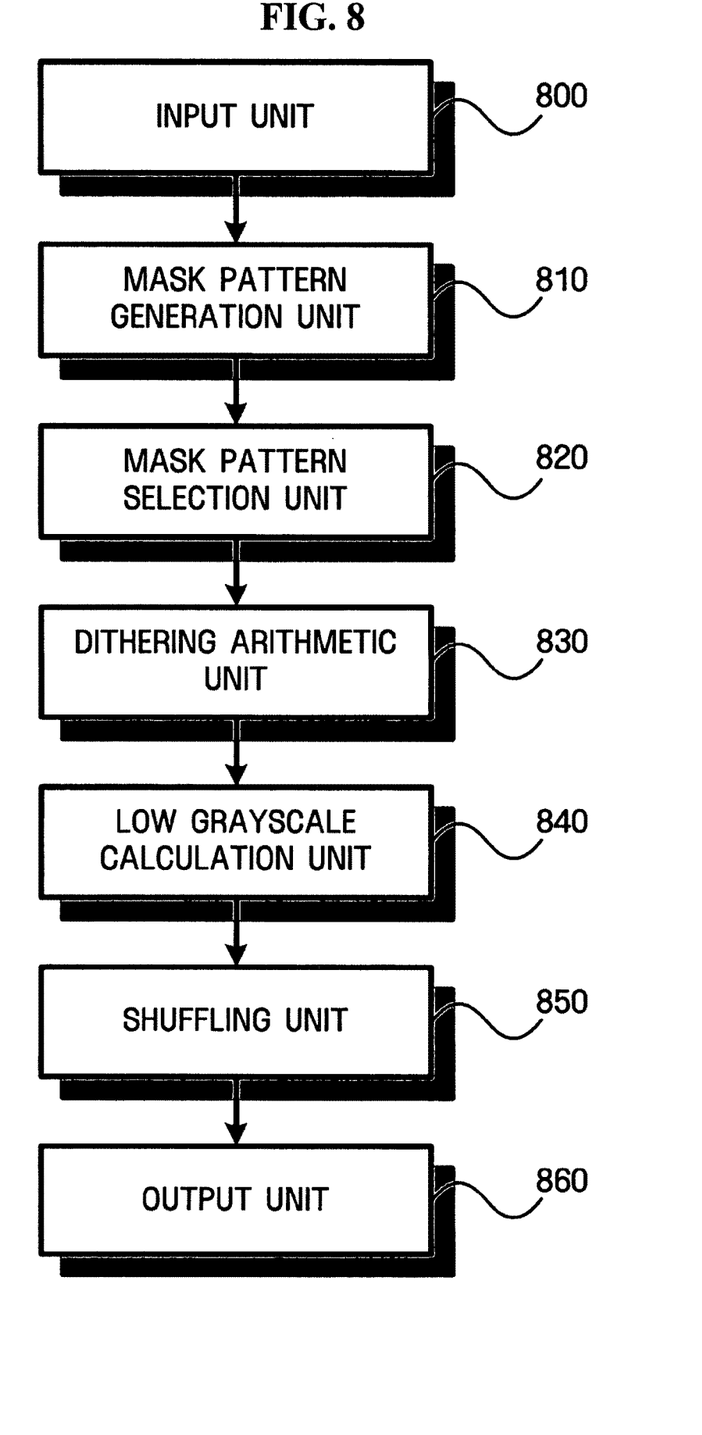
FIG. 8 is a block diagram of an apparatus to modulate sub-pixels in a multi grayscale monochrome output apparatus according to an embodiment of the invention.

FIG. 8 is a block diagram of an apparatus to modulate sub-pixels in a multi grayscale monochrome output apparatus according to an embodiment of the invention.

An apparatus to modulate sub-pixels in a multi grayscale monochrome output apparatus according to an embodiment of the invention includes an input unit 800, a mask pattern generation unit 810, a mask pattern selection unit 820, a dithering arithmetic unit 830, a low grayscale calculation unit 840, a shuffling unit 850, and an output unit 860.

The input unit 800 receives pixel information of a monochrome image. The input unit may receive information of a high grayscale (M+K)-bit monochrome image.

The mask pattern generation unit 810 generates the mask patterns. If the size of the mask pattern is determined, the elements of the mask pattern are determined, and the mask pattern generation unit generates the mask pattern accordingly. For example, when the 10-bit input signal is displayed on an 8-bit output apparatus, the number of the least significant bits is 2, and thus the elements of the mask pattern have an integer number ranging from 0 to $2^2-1$. Then, a plurality of mask patterns is generated by combining the elements.

When the input pixel is M+K bits, and the output pixel is M bits, the mask-patterns may be generated such that the dithering arithmetic are preformed by K as the number of the least significant bits. After the seed mask pattern is generated, a plurality of patterns is generated using the above-described Equation 2.

The mask pattern selection unit 820 selects the mask patterns for the individual sub-channels among the plurality of generated mask patterns. The mask patterns for the individual sub-channels may be arbitrarily selected from the plurality of generated mask patterns.

For example, when the number of sub-channels is three, three different mask patterns are arbitrarily selected among the plurality of mask patterns as the mask patterns for the individual sub-channels. Alternatively, the first channel mask pattern may be selected on the basis of a number generated by the random number generator, and the mask patterns having the values of other elements than the element (1, 1) of the first channel mask pattern as the element (1, 1) are selected for the second and third channels. For example, the second channel mask pattern may have the element (N, N) of the first channel mask pattern as the element (1, 1), and the third channel mask pattern may have the element (1, N) of the first channel mask pattern as the element (1, 1).

The dithering arithmetic unit 830 generates a weighted value having the weighted value 1 if the sum of the original pattern of each sub-channel and the sub-channel mask pattern is equal to or more than the critical value, and having the weighted value 0 if the sum is less than the critical value. Simultaneously, the dithering arithmetic unit 830 may compare the original pattern and the mask pattern so as to obtain the weighted pattern.

The low grayscale calculation unit 840 adds the weighted values to the M-bit input values obtained by truncating K bits from the (M+K)-bit original input values, thereby obtaining the M-bit output values. The M-bit output values may be obtained from R, G, and B channels serving as the sub-channels.

The shuffling unit 850 modulates the values of the individual sub-channels by a predetermined value when the M-bit sub-channel output values calculated by the low grayscale calculation unit 840 are the same. For example, when the 8-bit output values of the individual sub-channels calculated by the low grayscale calculation unit 840 are the same as 122, the shuffling unit selects two sub-channels among the sub-channels, adds +1 to on channel, and adds −1 to the other channel. Therefore, while the output values keep the average values, the values of the sub-channels vary, and thus a contour in an image can be eliminated.

The output unit 860 outputs the M-bit output values obtained by the dithering processing or the M-bit output values shuffled by the shuffling unit through an output device.

The term "unit", as used herein, that is, "module" or "table" means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed on one or more computers in a communication system.

Although the invention has been described in connection with the exemplary embodiments of the invention, it will be apparent to those skilled in the art that various modifications and changes may be made thereto without departing from the scope and spirit of the invention. Therefore, it should be understood that the above embodiments are not limitative, but illustrative in all aspects.

According to an embodiment of the invention, the following effects can be obtained.

First, a contour or image-quality deterioration when a high grayscale input signal is output as a low grayscale image can be prevented through the pixel modulation of the sub-channels by the dithering method and the shuffling method.

Second, with the pixel modulation of the sub-channels, a high-quality image can be represented by a low grayscale output signal.

Third, since the shuffling operation is provided, a contour that is not processed by dithering can be eliminated.

Effects of the invention are not limited to those mentioned above, and other effects of the invention will be apparently understood by those skilled in the art through the following description.

What is claimed is:

1. A method of modulating sub-channel pixels in a multi grayscale monochrome output apparatus that represents a high grayscale (M+K)-bit monochrome input image through low grayscale M-bit sub-channels, M and K being integers greater than or equal to 1, the method comprising:
   generating a plurality of mask patterns;
   selecting mask patterns for a plurality of sub-channels from the plurality of generated mask patterns;
   determining weighted values using the values of the selected mask patterns and data of K least significant bits of the input image; and
   calculating M-bit data of the plurality of sub-channels on the basis of the weighted values,
   wherein when the M-bit data of the plurality of sub-channels calculated in the calculating of the M-bit data are the same, the method further comprises:
   selecting two channels among the channels; and
   adding a predetermined positive number to the value of one channel, and subtracting a predetermined positive number from the value of the other channel.

2. The method of claim 1, wherein the generating of the plurality of mask patterns comprises generating the mask patterns having integer values ranging from 0 to $2^K-1$.

3. The method of claim 1, wherein the selecting of the mask patterns comprises selecting the mask patterns for the plurality of sub-channels among the plurality of mask patterns generated in the generating.

4. The method of claim 1, wherein when the number of the plurality of sub-channels is three, in the selecting of the mask patterns:
   a first channel mask pattern is selected by a random number generator,
   a mask pattern that is obtained by substituting the value of an element (N, N) of the first channel mask pattern having a N×N size with (1, 1) is selected as a second channel mask pattern, and
   a mask pattern that is obtained by substituting the value of an element (1, N) of the first channel mask pattern with (1, 1) is selected as a third channel mask pattern.

5. The method of claim 1, wherein the determining of the weighted values comprises assigning a weighted value 1 if the sum of each of the selected mask patterns and the K least significant bits (LSB) of the input image is equal to or more than a critical value and assigning a weighted value 0 if the sum is less than the critical value.

6. The method of claim 1, wherein the determining of the weighted values comprises assigning a weighted value 1 if the sum of each of the selected mask patterns and the K least significant bits (LSB) of the input image is equal to or more than the value of the corresponding mask pattern and assigning a weighted value 0 if the sum is less than the value of the corresponding mask pattern.

7. The method of claim 1, further comprising outputting an image having pixels, each pixel having M-bit data.

8. The method of claim 1, further comprising receiving an image having pixels, each pixel having (M+K)-bit data.

9. The method of claim 1, wherein when the M-bit data of the individual channels calculated in the calculating of the M-bit data are the same, the method further comprises:
   selecting two channels among the channels; and
   adding 1 to the value of one channel, and subtracting 1 from the value of the other channel.

10. An apparatus for modulating sub-channel pixels in a multi grayscale monochrome output apparatus that represents a high grayscale (M+K)-bit monochrome input image through low grayscale M-bit sub-channels, M and K being integers greater than or equal to 1, the apparatus comprising:
    a mask pattern generation unit generating a plurality of mask patterns;
    a mask pattern selection unit selecting mask patterns for a plurality of sub-channels from the plurality of generated mask patterns;
    a dithering arithmetic unit determining weighted values using the values of the selected mask pattern and data of K least significant bits (LSB) of the input image;
    a low grayscale calculation unit calculating M-bit data the plurality of sub-channels on the basis of the weighted values; and
    a shuffling unit selecting two channels among the channels when the M-bit data of the plurality of sub-channels calculated by the low grayscale calculation unit are the same, and adding a predetermined positive number to the value of one channel and subtracting a predetermined positive number from the value of the other channel.

11. The apparatus of claim 10, wherein the mask pattern generation unit generates the mask patterns having integer values ranging from 0 to $2^K-1$.

12. The apparatus of claim 10, wherein the mask pattern selection unit selects the mask patterns for the plurality of sub-channels among the plurality of mask patterns generated by the mask pattern generation unit.

13. The apparatus of claim 10, wherein when the number of the plurality of sub-channels is three, the mask pattern selection unit:
- arbitrarily selects a first channel mask pattern by a random number generator,
- selects, as a second channel mask pattern, a mask pattern that is obtained by substituting the value of an element (N, N) of the first channel mask pattern having a N×N size with (1, 1), and
- selects, as a third channel mask pattern, a mask pattern that is obtained by substituting the value of an element (1, N) of the first channel mask pattern with (1, 1).

14. The apparatus of claim 10, wherein the dithering arithmetic unit assigns a weighted value 1 if the sum of each of the selected mask patterns and the K least significant bits (LSB) of the input image is equal to or more than a critical value and assigns a weighted value 0 if the sum is less than the critical value.

15. The apparatus of claim 10, wherein the dithering arithmetic unit assigns a weighted value 1 if the sum of each of the selected mask patterns and the K least significant bits (LSB) of the input image is equal to or more than the value of the corresponding mask pattern and assigns a weighted value 0 if the sum is less than the value of the corresponding mask pattern.

16. The apparatus of claim 10, further comprising an output unit outputting an image having pixels, each pixel having M-bit data.

17. The apparatus of claim 10, further comprising: an input unit receiving an image having pixels, each pixel having (M+K)-bit data.

18. The apparatus of claim 10, further comprising a shuffling unit selecting two channels among the channels when the M-bit data of the individual channels calculated in the calculating of the M-bit data are the same, and adding 1 to the value of one channel, and subtracting 1 from the value of the other channel.

* * * * *